United States Patent
Hyvärinen et al.

(10) Patent No.: US 7,559,971 B2
(45) Date of Patent: Jul. 14, 2009

(54) METHOD FOR REMOVAL OF SILVER FROM A COPPER CHLORIDE SOLUTION

(75) Inventors: Olli Hyvärinen, Pori (FI); Marika Jyrälä, Pori (FI)

(73) Assignee: Outotec Oyj, Espoo (FI)

( * ) Notice: Subject to any disclaimer, the term of this patent is extended or adjusted under 35 U.S.C. 154(b) by 512 days.

(21) Appl. No.: 10/530,947

(22) PCT Filed: Sep. 30, 2003

(86) PCT No.: PCT/FI03/00707

§ 371 (c)(1),
(2), (4) Date: Apr. 8, 2005

(87) PCT Pub. No.: WO2004/033735

PCT Pub. Date: Apr. 22, 2004

(65) Prior Publication Data

US 2006/0000311 A1    Jan. 5, 2006

(30) Foreign Application Priority Data

Oct. 11, 2002    (FI) ................................. 20021813

(51) Int. Cl.
*C22B 3/22* (2006.01)
*C22B 11/10* (2006.01)

(52) U.S. Cl. .......................................... 75/741; 75/742
(58) Field of Classification Search .................. 75/724, 75/726, 733; 423/26
See application file for complete search history.

(56) References Cited

U.S. PATENT DOCUMENTS

| 4,124,379 A | 11/1978 | Peters et al. ................... 75/337 |
| 4,666,514 A * | 5/1987 | Bertha ........................... 75/429 |
| 4,670,052 A * | 6/1987 | Stanley et al. ................. 75/736 |
| 5,487,819 A | 1/1996 | Everett ........................ 205/347 |
| 6,007,600 A | 12/1999 | Hyvärinen et al. ............ 75/740 |

FOREIGN PATENT DOCUMENTS

DE    3812501    7/1989
GB    2118536 A  * 11/1983

OTHER PUBLICATIONS

Guerriero et al. Derwent ACC No. 1983-789093 Metal recovery esp. from lead electrorefining slimes by leaching with hydrochloric acid solution. Apr. 5, 1982.*
Grit and Microgrit Conversion Chart at READE. http://www.redae.com/Sieve/grit_conversion.html. Copyright 1997.*

(Continued)

*Primary Examiner*—George Wyszomierski
*Assistant Examiner*—Tima McGuthry Banks
(74) *Attorney, Agent, or Firm*—Buchanan Ingersoll & Rooney PC

(57) ABSTRACT

The invention relates to a method for removing silver from a chloride solution in a copper recovery process. According to this method, silver is removed using fine-grained copper powder and mercury. Silver removal occurs in at least two stages and mercury is fed into the solution at a certain molar ratio with regard to the silver in the solution.

18 Claims, 1 Drawing Sheet

OTHER PUBLICATIONS

Sammut et al. "The Intec Copper Process: A Detailed Environmental Analysis." from the Green Processing Conference, Cairns, Qld, 29-31 pp. 115-124. May 2002. http://www.intec.com.au/docs/presentations/Green%20Processing%202002.pdf.*

Machine translation of DE38112501. Nov. 19, 1992.*

Moyes, John A. "Intec Copper Sustainable Processing", Intec Ltd. Website, Dec. 21, 2001 (Revised Apr. 2002).

* cited by examiner

METHOD FOR REMOVAL OF SILVER FROM A COPPER CHLORIDE SOLUTION

The invention relates to a method for removing silver from a copper chloride solution in a copper recovery process. According to this method, silver is removed using fine-grained copper powder and mercury. Silver removal occurs in at least two stages and mercury is fed into the solution at a certain molar ratio with regard to the silver in the solution.

U.S. Pat. No. 6,007,600 describes a method for the hydrometallurgical production of copper from copper-containing raw materials such as copper sulphide concentrate. According to the method the raw material is leached counter-currently with a strong sodium chloride-copper chloride solution in several stages to form a monovalent copper(I) chloride solution. Since both some divalent copper chloride and impurities composed of other metals always remain in the solution, reduction of the divalent copper and solution purification are performed. The pure cuprous chloride solution is precipitated with sodium hydroxide to copper oxidule and the oxidule is reduced further to elemental copper. The sodium chloride solution generated during copper oxidule precipitation is treated further in chlor-alkali electrolysis, and the chlorine gas and/or chloride solution obtained from this is used as a raw material for leaching, the sodium hydroxide formed in electrolysis for oxidule precipitation and the hydrogen for the reduction of copper to elemental copper. U.S. Pat. No. 6,007,600 focuses on the copper recovery method as a whole, but silver recovery for example is not described in detail.

When copper raw material is dissolved so that the copper in the chloride solution is in monovalent form, it means that silver has also dissolved. Since the properties of the metals are near each other, separation by precipitation with copper powder alone is not enough to provide a sufficiently good end result but silver recovery requires the use of other methods too.

According to the method in the above-mentioned U.S. Pat. No. 6,007,600 copper oxidule is precipitated from the cuprous chloride solution using sodium hydroxide. In copper oxidule precipitation, silver is precipitated from the solution with the copper. Since the intention is to produce LME A grade copper in this process, it is important that the level of silver in the cuprous chloride solution corresponds to the purity requirements of LME A grade copper. For example, the permissible amount of silver in LME A grade cathode copper is <25 ppm (BS 6017:1981). If there is for instance 60 g/L of copper in the copper chloride solution, then the amount of silver in the solution must be less than 1.5 mg/L in order to attain the required LME grade.

U.S. Pat. No. 5,487,819 describes the method developed by Intec Ltd for the hydrometallurgical production of copper from a copper-containing raw material such as copper sulphide concentrate. According to this method, the raw material is leached in a countercurrent leaching with a sodium chloride-copper chloride solution in several stages to form a copper(I) chloride solution. The solution formed also undergoes silver removal. First the cuprous chloride solution is passed over elemental copper in order to precipitate silver on the surface of the copper. Then the solution is routed to the electrowinning cell, which is equipped with a mixer. The cell may contain a copper anode, which is surrounded by a cylindrical titanium wire gauze cathode, or the electrodes may be formed of granular or briquette copper in a titanium basket. Mercury in ionic form is fed to the solution and a Cu/Hg/Ag amalgam is formed on the cathode. The amalgam is dissolved in a strong solution of cupric chloride, which breaks the amalgam down into cupric and mercury ions. When the solution is diluted, silver chloride is precipitated and is then treated thermally to produce metallic silver.

An article entitled "Intec Copper Sustainable Processing", 21 Dec. 2001, is available on Intec Ltd's website which describes the present silver removal in the copper recovery process. According to the article, the removal of silver from the copper chloride solution going to copper electrowinning is performed by adding soluble mercury and aluminium to the pregnant solution. Aluminium forms a 'copper sponge' with the copper in the solution, which has a large surface area, enabling the silver to be removed galvanically from the solution as an amalgam. The amalgam is treated to produce soluble mercury for recycle to the beginning of the circuit. The silver is recovered as silver bullion.

U.S. Pat. No. 4,124,379 describes a method for the recovery of copper from concentrates containing silver and iron using chloride leaching. In a silver removal column there is formed of an amalgam of mercury and some other metal such as copper, iron or zinc. Iron and zinc alone would reduce the monovalent copper completely from the solution, but when they form and amalgam with mercury, the copper is precipitated only a little. Copper is the preferred metal and can be used in granular form, which is covered with mercury. The cuprous chloride solution is fed into the column and brought in contact with the amalgam, and the metal in the amalgam replaces the silver in the solution. Silver is recovered in a silver recovery circuit, where mercury distillation takes place.

The silver electrolysis with titanium wire-gauze cathodes described in U.S. Pat. No. 5,487,819 appears complicated to implement. In the more recent version of the process electrolysis has been replaced by the addition of mercury and aluminium to the solution. However, the aim in production of pure copper is to avoid introducing all new ions such as the aluminium ion into the solution, since they generally also require their own removal process. U.S. Pat. No. 4,124,379 has two stages: the coating of copper (or some other metal) with mercury and the distillation of mercury, which are not recommended these days for reasons of environmental hygiene.

Now a method has been developed for the removal of silver from a cuprous chloride solution in the hydrometallurgical recovery process of copper. The method is simpler than those described above and does not require the addition of extra substances to the cuprous chloride solution other than soluble mercury and copper powder.

It is characteristic of the method of this invention that the precipitation of the silver from the cuprous chloride solution occurs in at least two stages using soluble mercury and fine copper powder. In the silver recovery stages there is some fine-grained copper in the precipitation stage reactors, which deposits the silver from the solution. This reaction does not entirely reach completion, as the copper also acts as a precipitation surface in the amalgam precipitation that occurs with mercury. In the first amalgam precipitation stage the molar ratio of the mercury to be fed into the solution to the silver in the solution is adjusted to between 0.5-2 to one and in the second stage the mercury: silver molar ratio is adjusted to a minimum of 2 to one. Any mercury left in the cuprous chloride solution is precipitated out with fine copper powder so that the solution going for further treatment is mercury-free. The deposit formed in precipitation and the remaining fine-grained copper in it is recycled countercurrently to the direction of the solution in the silver removal stages. The precipitated silver-amalgam is treated to leach the mercury and recycle it back to the silver precipitation stages while the silver is deposited as silver chloride.

In the hydrometallurgical recovery of copper based on chloride leaching the first stage is usually the leaching of a sulphidic copper concentrate, where the copper in the subsequent solution is mainly monovalent. In these circumstances silver also dissolves in monovalent form. Whether the further treatment of the solution is electrowinning or copper oxidule precipitation, it is beneficial that all the copper in the solution is monovalent. For this reason after leaching the divalent copper of the concentrate in the solution is removed either by reduction or precipitation. The next process stage is the removal of impurities (other metals) and silver removal can be seen as a part of this stage. The precipitation of silver from the cuprous chloride solution as an amalgam in accordance with this invention is simple, in that special conditions are not required. In fact it can be carried out at the temperature and pH the solution has when it comes from the preceding process stage. The temperature of the solution from the divalent copper removal stage is in the range of 50-70° C. and the pH 1-5. The reactors used in the different stages of silver removal are mixing reactors. The stage may include one or several reactors, although in the description of the invention we speak for simplicity of only one reactor per stage. Silver removal can be performed either as a batch or a continuous process. In particular, it is preferable to arrange the flow of solution from one stage to the next continuously.

The first stage of silver removal is preferably a precipitate stage using only fine-grained copper. In this way using only copper precipitate the silver level in the solution can drop to around 30 mg/l and at the same time the use of mercury in subsequent stages is minimized. The precipitated metallic silver can be kept in the reactor until all the copper has dissolved and the pure (in practice over 90%) silver powder can be recovered from the reactor. Copper precipitation occurs according to the following reaction:

$$Cu + Ag^+ \rightarrow Ag + Cu^+ \quad (1)$$

If the amount of silver in the raw material is small, for instance less than 30 mg/l, the silver precipitation stage performed with copper powder only may be omitted completely and the precipitation stages performed using mercury only may be used instead.

The cuprous chloride solution is fed to the second stage of silver removal, which takes place with mercury. This can also be called the first amalgam precipitation stage. The reactor contains copper, including also copper amalgam, which has been moved there from a later silver removal stage. An amount of soluble mercury is fed to the solution with the molar ratio of between 0.5 and 2, preferably 1, to the amount of silver present in the cuprous chloride solution. The majority of the silver in the solution precipitates in this stage as a silver amalgam. The reactions can be described for example as follows:

$$2Cu + Hg^+ \rightarrow CuHg + Cu^+ \quad (2)$$

$$CuHg + Ag^+ \rightarrow HgAg + Cu^+ \quad (3)$$

The reactions show that when the silver and mercury precipitate from the solution as a silver amalgam, the copper dissolves at the same time. The precipitate is removed from the reactor for mercury leaching and silver recovery.

The cuprous chloride solution is fed to the third silver removal stage, which may also be termed the second amalgam precipitation stage. The molar ratio of the mercury fed to this stage to the silver in the solution is at least two to one, preferably five to one. Since there is only a few milligrams of silver left dissolved in the cuprous chloride solution, less than ten per cent, the amount of mercury required in this stage is however smaller than the amount fed to the first stage. Additionally in this stage there is some fine-grained copper in the reactor, fed there from the mercury removal stage. Mercury is precipitated from the solution forming a copper amalgam on the surface of the copper, onto which silver is precipitated as a silver amalgam in accordance with reactions (2) and (3). The precipitate is conveyed to the first amalgam precipitation stage. After precipitate, the silver content of the cuprous chloride solution removed from the third stage has fallen to such a level that the amount of silver in the final product is less than that demanded for the LME grade.

In order for the cuprous chloride solution to be mercury-free, a further mercury removal is performed on the solution in the mercury removal stage. Mercury is removed using fine-grained copper and the amount of Cu powder to be fed is in the range of 100 g/l when its particle size is below 200 μm. The copper used in the precipitation stages may be coarser, but in that case the amount used is greater, because the precipitation surface decreases as the particle size grows. The solid material that settles on the reactor floor is moved countercurrently to the solution i.e. the solids obtained from the mercury removal stage are recycled to the third silver removal stage and from there on to the second stage, where they are removed for silver and mercury separation.

The deposit removed from the second silver removal stage (the first amalgam precipitation stage) contains mainly a silver amalgam, which includes a little copper. The deposit is leached into a dilute chloride solution by oxidation. The oxidant may be for instance hydrogen peroxide $H_2O_2$, oxygen $O_2$ or sodium hypochlorite NaOCl. During leaching mercury dissolves and is fed as a mercury chloride solution back to the precipitation stages. Silver precipitates in these conditions as silver chloride and is routed for the desired further treatment for recovery as metallic silver. The Hg chloride content of the solution obtained from the leaching stage is adjusted to get the correct molar ratio before being fed to the precipitation stages.

BRIEF DESCRIPTION OF THE DRAWING

The invention is described further with the aid of the attached diagram, where.

Figure 1:
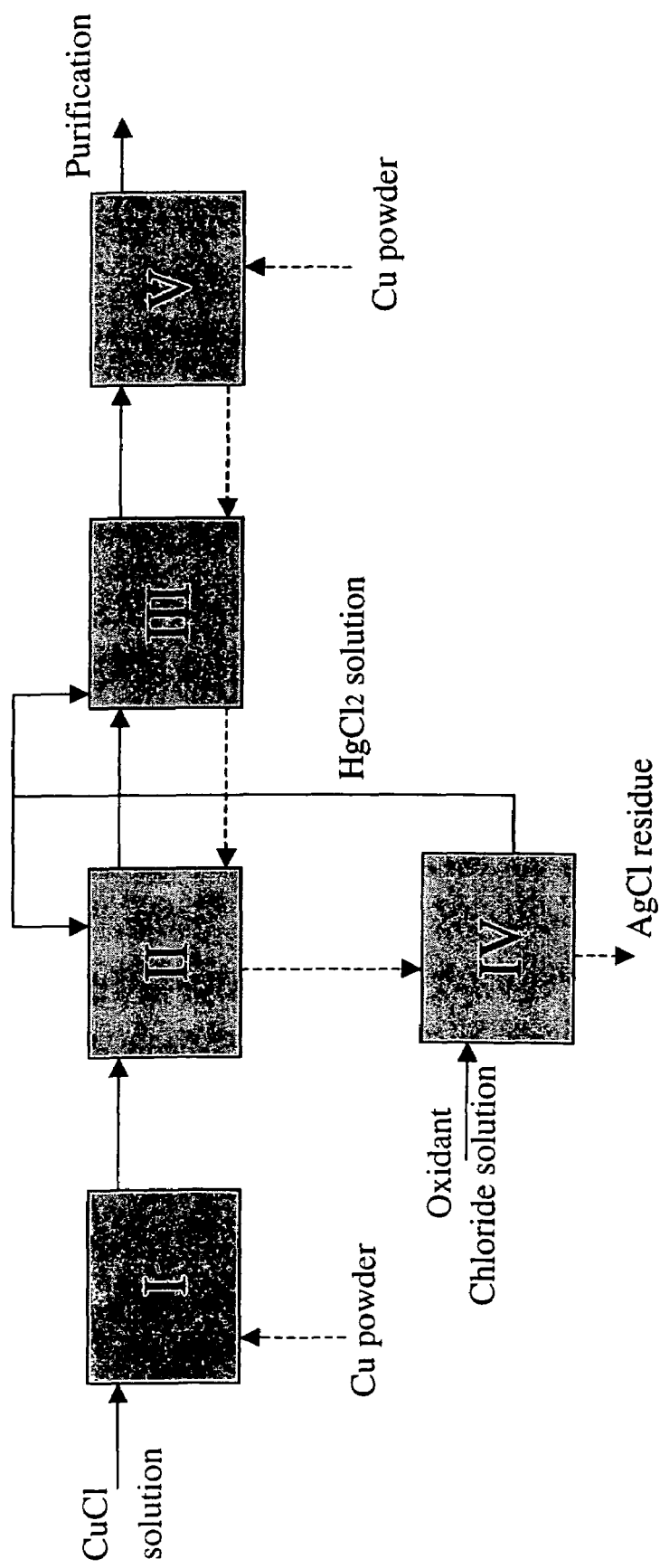
FIG. 1 is a flowsheet of one method in accordance with the invention.

According to the flowsheet in FIG. 1 a cuprous chloride solution is fed to the first silver removal stage I, where part of the silver in the solution is removed by copper powder precipitation alone. The amount of copper powder fed to stage I is in the range of 100 g/L, when the particle size is less than 200 μm. The reactor used in this stage is a mixing reactor, from which both the solution and the metallic silver mixed in it can be fed to the subsequent stage or the silver separated from the bottom of the reactor by dissolving the copper (not shown in the diagram).

The cuprous chloride solution from stage I is fed to stage II, which is the first amalgam precipitation stage. Soluble mercury is also added in the form of mercury chloride for example. The amount of mercury to be fed is in a molar ratio of 0.5-2:1 of the amount of silver in the solution. In the final silver removal stage III the precipitated silver amalgam and the undissolved copper powder are fed to the precipitation stage II, countercurrently to the cuprous chloride solution. Over 90% of the silver still in the solution is precipitated in the second stage, and the silver amalgam is fed to the silver separation stage IV.

In separation stage IV the silver amalgam is leached in a dilute chloride solution by oxidizing the solution. Oxidation can take place for instance using sodium hypochlorite. As a result of leaching the mercury dissolves as mercury chloride and the silver is precipitated as silver chloride. The mercury chloride solution is fed back to stages II and III. If any undissolved copper has been remained in the amalgam deposit when the deposit is routed to the oxidation/leaching stage, the entry of copper in the mercury chloride solution does not harm the process.

The third silver removal stage III i.e. the second amalgam precipitation stage functions like the first one, but now the molar ratio of the mercury to be fed to the solution to that of the silver in the solution is determined so that there are at least 2, preferably 5, moles of mercury to each mole of silver. The molar ratio may be anywhere between 2-10. The precipitate from the final stage V of silver removal is also conveyed to this stage. The silver content of the solution leaving this stage is less than 1 mg/L, which corresponds to a content of <25 ppm in the finished product. The silver amalgam precipitated from the solution and any undissolved copper powder are conveyed on to the second silver removal stage.

So that no mercury remains in the cuprous chloride solution, mercury is removed from the solution in mercury removal stage V by adding fine-grained copper powder to the solution. The amount of copper powder to be fed is around 100 g/l, when the particle size of the powder is below 200 μm. The mercury in the solution is precipitated on the surface of the copper in accordance with reaction (2) so that in practice there is no mercury in the solution exiting this stage. The precipitate is conveyed to the second amalgam removal stage. After the removal of the mercury the cuprous chloride solution is routed to the other stages of solution purification.

EXAMPLE 1

The removal of silver from a cuprous chloride solution was studied in continuous laboratory pilot tests. Silver removal was done in three stages in mixing reactors connected in series. A batch of fine-grained copper powder with an average particle size of 100 μm was placed in the reactors. The effective volume of the reactors was 1.5 litres. The feed solution was a concentrated chloride solution of monovalent copper with a copper content of 60 g/L and a sodium chloride content of about 280 g/L. The solution flow was 1.5 L/h and the temperature 60° C. The silver content of the feed solution was 110 mg/L and the pH 3. The target was to reduce the silver content of the solution to below 1 mg/L.

In the first stage silver was removed from the solution by precipitation in the mixing reactor using a batch of pure copper powder. In this precipitation stage the silver content of the solution fell to around 30 mg/L.

The solution, with a silver content of around 30 mg/L, was routed to the second stage, where there was a batch of copper powder in the mixing reactor. 60 mg/L of mercury as a solution of $HgCl_2$ was fed continuously to the second stage, corresponding to a molar ratio of 1:1 with regard to the silver content of the feed solution. Silver and mercury were precipitated from the solution together forming an AgHg amalgam corresponding to their feed ratio on the surface of the copper particles. At the same time copper dissolved in the solution as $Cu^+$ ions. After the second stage the silver content of the solution was about 3 mg/L.

The solution, with a silver content of about 3 mg/L, was routed to the third stage, where there was a batch of copper powder in the mixing reactor. 30 mg/L of mercury as a solution of $HgCl_2$ was also fed continuously to the third stage, corresponding to a molar ratio of 5:1 with regard to the silver content of the feed solution. Mercury was precipitated from the solution forming a layer of CuHg amalgam on the particle surface. The CuHg amalgam formed deposited the silver from the solution. After the third silver removal stage the silver content of the solution was as targeted below 1 mg/L.

In all three silver removal stages it was possible to utilize the copper batches in the reactors in the precipitation reactions almost completely. Thus in theory the feed of solution could continue as long as copper remained in the reactors. In practice at the end of the tests less than 5% copper remained in the solids in the reactors.

The $HgCl_2$ solution used for the mercury addition was prepared by leaching a deposit containing mercury, silver and copper. The deposit is formed in the second silver removal stage, when silver and mercury are precipitated on the surface of copper powder and the copper dissolves at the same time. This deposit is leached by oxidizing into a dilute chloride solution, whereby the silver is recovered as a poorly soluble silver chloride (AgCl) and the mercury can be recycled as an $HgCl_2$ solution to the silver removal precipitation stage. If the deposit contains copper, it dissolves and ends up in solution with the mercury and further on in the silver removal precipitation stage.

50 g deposit, with a composition of 65% Hg, 25% Ag and 10% Cu was leached by oxidizing into 1 litre of 1 M HCl solution at a temperature of 80° C. The oxidant used was a solution of NaOCl, which maintained a high oxidation potential, over +800 mV (vs. AgCl/Ag). The mercury and the copper dissolved into the solution as divalent ions. The silver and the chloride formed silver chloride, which is poorly soluble in a dilute chloride solution. The AgCl deposit was removed from the solution.

After the three-stage silver removal series a fourth mixing reactor was connected, with a batch of copper powder in the reactor. The copper deposited the mercury left in the solution from the previous stages, and after mercury removal the Hg content of the solution was less than 0.2 mg/L.

The invention claimed is:

1. A method for the removal of silver from a cuprous chloride solution in a copper recovery process, comprising removing, in at least two stages, silver from the cuprous chloride solution with soluble mercury, wherein fine-grained copper powder is fed countercurrently to the cuprous chloride solution, the method comprising:

feeding mercury into the cuprous chloride solution at preselected stages in a preselected molar ratio to the silver in the solution;

precipitating silver amalgam onto the surface of fine-grained copper powder;

removing the precipitated silver amalgam from the cuprous chloride solution for the separation of mercury and silver;

recycling soluble mercury back to silver removal; and treating the removed precipitated silver amalgam for the recovery of silver;

wherein the treating step comprises leaching the precipitated silver amalgam into a dilute chloride solution using an oxidant, whereby the mercury dissolves as mercury chloride and the silver precipitates as silver chloride.

2. The method according to claim 1, wherein the molar ratio of mercury to silver in a first silver removal stage is 0.5-2.

3. The method according to claim 1, wherein the molar ratio of mercury to silver in a second silver removal stage is at least 2.

4. The method according to claim 3, wherein the molar ratio of mercury to silver in the second silver removal stage is between 2-10.

5. The method according to claim 1, wherein the fine-grained copper powder has a particle size of less than 200 μm.

6. The method according to claim 5, wherein the amount of fine-grained copper powder being countercurrently fed is about 100 g/L based on the cuprous solution.

7. The method according claim 1, further comprising feeding the fine-grained copper powder countercurrently to a mercury removal stage after the at least two silver removal stages.

8. The method according to claim 1, wherein the oxidant is sodium hypochlorite.

9. The method according to claim 1, wherein the oxidant is hydrogen peroxide.

10. The method according to claim 1, wherein the oxidant is oxygen.

11. The method according to claim 1, further comprising routing the dissolved mercury chloride back to the leaching step.

12. The method according to claim 1, further comprising routing the silver chloride to a silver recovery step.

13. The method according to claim 1, wherein the chloride content of the dilute chloride solution in the leaching step is at least 200 g/L.

14. The method according to claim 1, wherein the cuprous chloride solution comprises 30-100 g/L of monovalent copper.

15. The method according to claim 1, wherein the cuprous chloride solution has pH value of 1-5 in the precipitating and removing steps.

16. The method according to claim 1, further comprising removing silver from the cuprous chloride solution using fine-grained copper powder in a stage prior to the at least two silver removal stages.

17. The method according to claim 16, wherein the fine-grained copper powder has a particle size of less than 200 μm.

18. The method according to claim 17, wherein the amount of fine-grained copper powder being countercurrently fed is in the range of 100 g/L.

* * * * *